Jan. 22, 1929.
J. E. KENNEY
1,699,893
BATTERY INDICATOR
Original Filed July 8, 1925
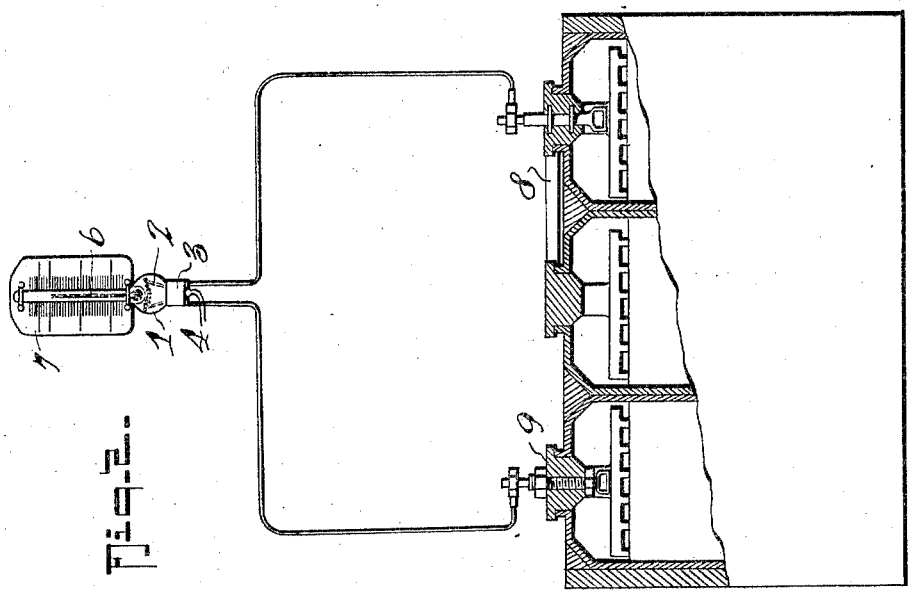
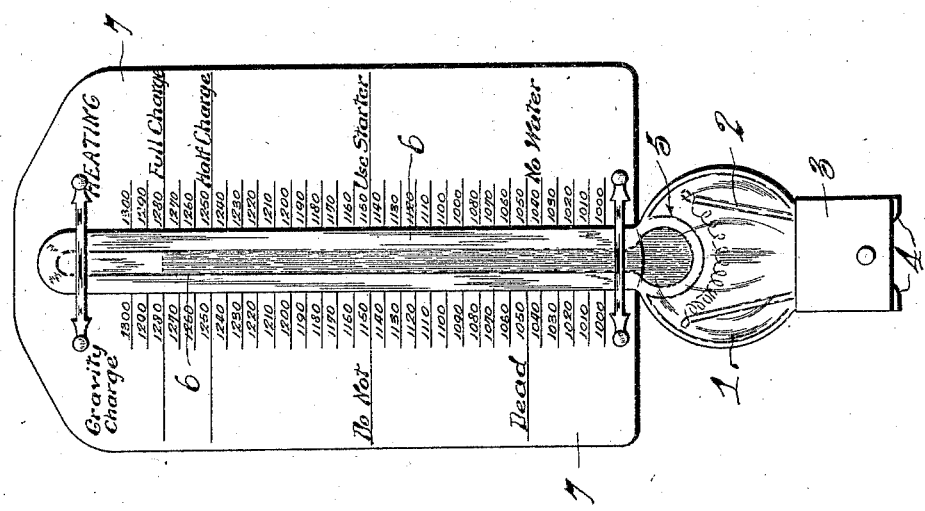
INVENTOR
John E. Kenney.
BY
Albert E. Dietrich
ATTORNEY Patented Jan. 22, 1929.

1,699,893

UNITED STATES PATENT OFFICE.

JOHN E. KENNEY, OF PORTLAND, OREGON, ASSIGNOR TO JOSEPH E. DUNNE, OF PORTLAND, OREGON.

BATTERY INDICATOR.

Application filed July 8, 1925, Serial No. 42,224. Renewed November 26, 1928.

The present invention relates to the art of indicators and more particularly to that branch of the art that has to do with indicating the condition of storage batteries, especially those used on motor vehicles.

The invention has for its object to provide an electrically operated hydrometer to give the motorist a constant reading of the charge in his battery and also to indicate to him the amount of fluid which the battery contains, i. e. whether or not there is a sufficient quantity of fluid present properly to cover the plates. It is a well known fact that practically every operator of an automobile which is equipped with a storage battery that is used for starting, lighting and ignition purposes, at sometime or another wonders whether or not his battery is fully charged. For instance, if one is a long ways from home or from a service station and the generator of the car ceases to send a flow of current through the battery, thereby ceasing to charge the battery, which is the only source of ignition and light, one immediately is inconvenienced and the mind is distracted from driving, making accidents through worry as to whether or not the battery has sufficient energy output for the return trip or to reach the destination. Equipped with the instrument for which I am making application for patent one would know the exact amount of energy contained in the battery. If the battery is a little low the generator may be set up, i. e. an adjustment may be made to the generator to pass more current through the battery. If the battery is a little hot, the adjustment of the generator may be reversed or some of the lights cut into circuit with the battery to reduce its charge and thereby lower the temperature to the proper degree.

Generically the invention provides a heating element, located within a vacuum bulb, which element is connected in closed circuit with the battery, the temperature of the element rising and falling with the charge in the battery, due to the rise and fall of the battery voltage and current; the temperature of the heating element is indicated to the attendant or operator by means of a thermometer, the bulb of which is sealed in the vacuum tube and located in association with the heating element, whereby the heat changes will affect the action of the thermometer; the invention also provides a suitable scale arrangement associated with the thermometer to indicate the specific gravity of the electrolyte, also to indicate the condition of the fluid within the battery (whether its level is too low or not) and such other indicating data as may be useful under the circumstances, as for example "Don't use starter", "Battery dead", "Battery heating", "No water", etc.

In its more specific nature the invention furthermore resides in those novel features of construction, combination and arrangement of parts, as will be hereinafter fully described, and then be specifically pointed out in the appended claims, reference being had to the accompanying drawings, in which Figure 1 is an elevation of my instrument.

Figure 2 is a diagrammatic view showing the connection of the instrument with the battery.

In the drawings, in which like numerals of reference indicate like parts in all the figures, 1 represents the vacuum bulb in which the filament 2 is located, the bulb being mounted on a suitable base 3 which may be designed to fit the standard bayonet type socket, the base being, preferably, of the double contact type, the contacts 4 being exposed for connection with the contacts of a suitable socket into which the base may be fitted and which in turn may be connected with the battery of the car.

5 represents the bulb of a thermometer which is sealed within the vacuum bulb 1 and which has its stem 6 extended upwardly and associated with a suitably constructed dial or indicator plate 7 which is suitably graduated to indicate the specific gravity of the electrolyte. It may also contain such other indications as "Do not use starter", "Dead battery", "No water", "Full charge", "Half charge", "Heating", etc. as may be found desirable.

One of the contacts 4 is electrically connected to the positive terminal 8 of the storage battery, while the other contact 4 is connected to a metallic terminal 9 which is immersed in the electrolyte when the same is at normal level but which will be uncovered when the electrolyte is low and thus cut out the filament 2, thereby indicating the low-water condition of the battery.

From the foregoing it will be noted that the instrument operates on the closed circuit principle. The temperature of the heating element is in direct correspondence to the current passing through it. This temperature is recorded by means of a mercury tube, the reading of which is an exact equivalent to the temperature of the heating element, and the heating element's temperature is the exact equivalent of the amount of current passing through it. The heating element is composed of a high resistance material, not easily burned away and is of such size as not to require more than an extremely small amount of electrical current to heat it.

The positive terminal of the instrument being directly connected to the positive pole of the battery and the negative terminal of the instrument being connected by a metallic pole projecting into the battery electrolyte, ending just before it reaches the plates, the electrolyte must be of sufficient height to keep the circuit closed, or the negative terminal may be directly connected with the negative pole of the battery by means of a wire, but in so doing the instrument would not register the amount of fluid in the battery.

From the foregoing description, taken in connection with the accompanying drawings, it is thought the complete construction, operation and advantages of my invention will be clear to those skilled in the art to which it relates.

What I claim is:

1. A battery indicator unit comprising an electric-light bulb having a base with terminal contacts, a heating filament within the bulb and electrically connected with the contacts, a liquid-column thermometer having a bulb sealed within the upper portion of the electric-light bulb in proximity to the heating filament.

2. A battery indicator unit comprising a thermometer having a bulb, a vacuum bulb in which the thermometer bulb is located, an electric heating element within said vacuum bulb and located below and in association with said thermometer bulb, said heating element consisting of a coil, the axis of which is bent substantially concentrically with the curvature of the vacuum bulb, and means whereby said heating element may be connected in circuit with the battery.

3. A battery indicator unit comprising a thermometer having a bulb, a vacuum bulb in which the thermometer bulb is located, an electric heating element within said vacuum bulb in association with said thermometer bulb, and means whereby said heating element may be connected in circuit with the battery, said thermometer including a dial plate and a stem associated with the dial plate, said dial plate having suitable graduations and indicating data to inform the user of the condition of the battery.

JOHN E. KENNEY.